Feb. 19, 1957   F. E. BRETZ, JR   2,781,954
METERING VALVE
Filed April 7, 1955   2 Sheets-Sheet 2
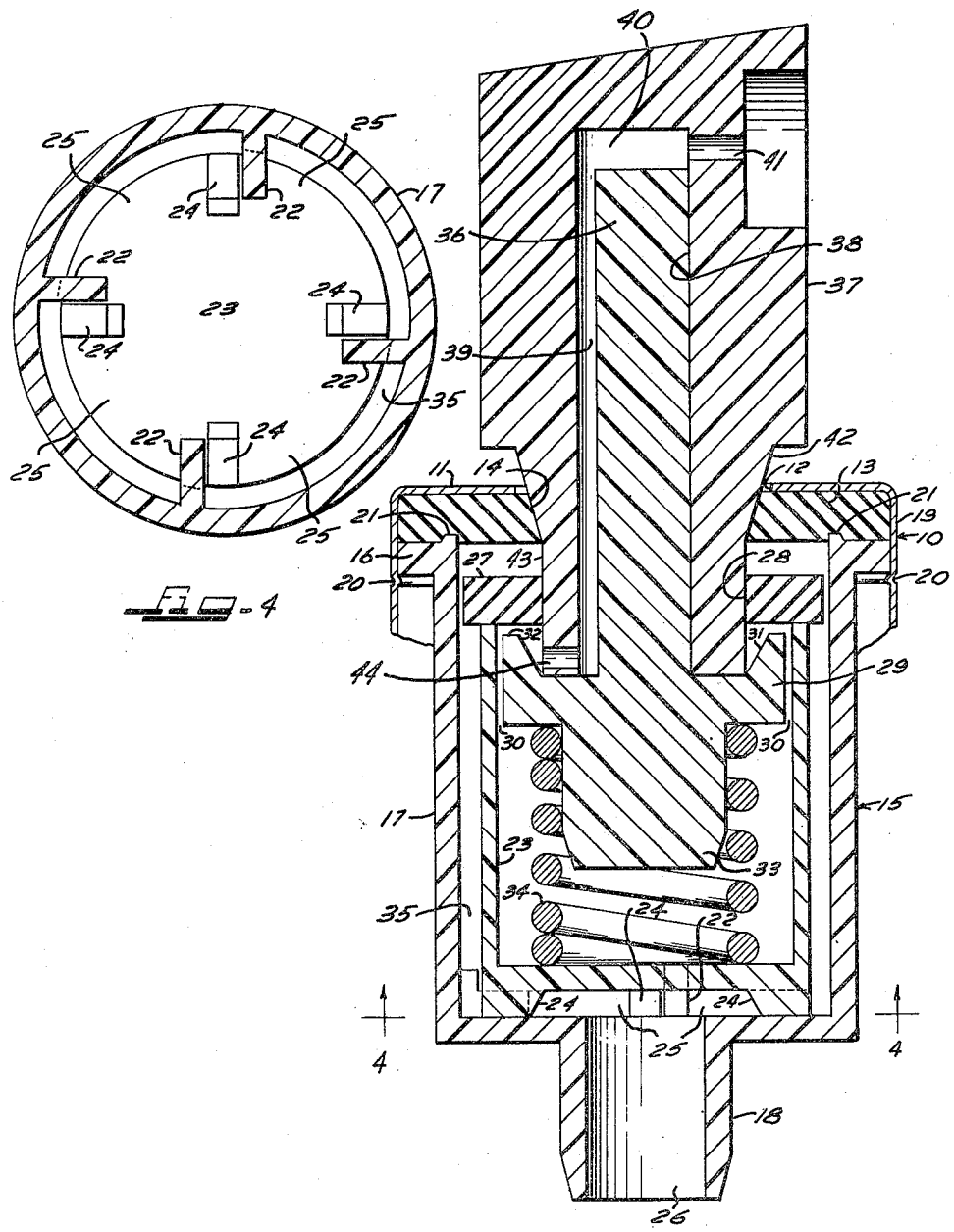
INVENTOR
FRANK E. BRETZ, JR.

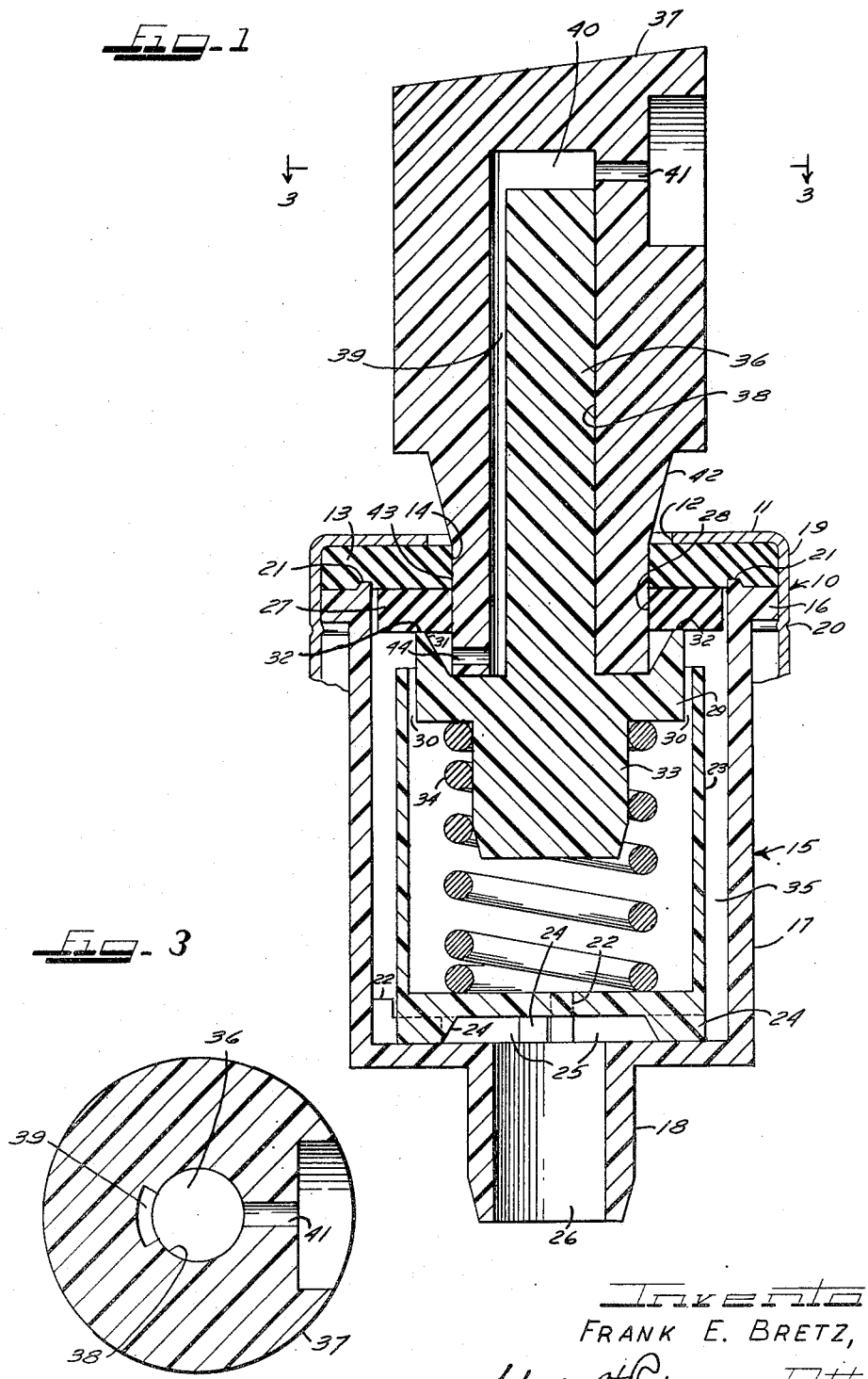

United States Patent Office 2,781,954
Patented Feb. 19, 1957

2,781,954

METERING VALVE

Frank E. Bretz, Jr., Elmhurst, Ill., assignor to Delta Dynamics, Inc., River Grove, Ill., a corporation of Illinois Application April 7, 1955, Serial No. 499,806

13 Claims. (Cl. 222—394)

This invention relates to valve mechanisms and more particularly to a metering valve for dispensing predetermined uniform volumes of material in spray form from a pressurized container.

The valve of the present invention is especially adapted for use with aerosol containers. Contents under pressure are discharged from the container by manual actuation of the valve. Each valve actuation effects the discharge of the same amount of material from the container.

In the usual valve construction, the container contents are discharged so long as the valve is held in an open position. The user determines the amount or volume of material to be ejected. There are, however, certain materials which best lend themselves to use in fixed amounts. This metering feature is obtained with the present valve construction.

Generally, the valve of this invention provides a metering cup which, when the valve is inoperative, is in flow communication with the interior of the container. When the valve actuating button or spray tip is moved to a partly actuated position, the metering cup and its contents are sealed. Continued actuation of the button to a position completely opening the valve effects a connection of the metering cup to flow communication with the atmosphere. As the material is pressurized, the contents of the metering cup are completely ejected. When the button is released the valve closes and the metering cup is again opened to be filled from the interior of the container. By this arrangement, each actuation of the valve effects a discharge of the contents of the cup or a predetermined uniform quantity of material.

An important object of this invention, then, is the provision of a volumetric dispensing valve.

Another object of this invention is the provision of a dispensing valve for metering predetermined volumes of material from a container.

A further object of the invention is the provision of a dispensing valve for metering a predetermined volume of material from a container with each actuation of the valve.

A still further object of the invention is the provision of a dispensing valve so constructed as to automatically meter the same volume of material from a container with each actuation of the valve.

Still another and further object of the invention is the provision of a dispensing valve mechanism which is simple in construction and highly efficient in operation.

Other objects and advantages of the invention will become more apparent from the following detailed description taken in connection with the accompanying drawings, in which:

Figure 1 is a fragmental vertical cross-sectional view of the valve device of this invention shown as being mounted in a container and in a closed position;

Figure 2 is a view, similar to Figure 1, showing the relative positions of parts when the valve mechanism is in an open position;

Figure 3 is a horizontal cross-sectional view taken along a plane indicated by the line 3—3 of Figure 1; and Figure 4 is a horizontal cross-sectional view taken along a plane indicated by the line 4—4 of Figure 2.

Referring now to the figures of the drawings, the reference numeral 10 designates the head of a container for holding aerosol material under pressure. As shown, the head 10 is tubular. The container proper may be formed of any suitable material, such as metal or a non-resilient plastic, which will withstand the internal pressure exerted by the particular dispersant utilized as a propellant in the stored spray or aerosol material.

The top wall 11 of the container head has a central opening 12 provided for a purpose to be explained in detail later herein. A disc type gasket 13, made of any suitable elastic and resilient material such as natural or synthetic rubber or the like, is seated against the top wall 11 within the container head. A central opening 14 in the gasket is smaller than and concentric with the opening 12 in the top wall of the container head.

A valve housing 15, preferably of non-resilient material, has an annular flange 16 sized to seat in the container head and against the underside of the gasket 13. The housing has a cylindrical body 17 terminating at its lower end in a tubular inlet member 18. The sidewall 19 of the container head is provided with an inwardly extending annular crimp 20 bearing against the underside of the annular flange 16 to seat the flange against the gasket 13 and hold the assembly within the container. An annular rib or sealing ring 21, formed on the upper surface of the valve housing, is impressed into the disc gasket when the flange 16 is forced and held against it by forming the annular crimp 20 after the parts are assembled. The gasket is thereby squeezed into tight sealing engagement with the walls of the container head.

As best shown in Figures 1 and 4, the body 15 of the valve housing has a plurality of circumferentially spaced positioning and seating lugs 22, 22 located on the bottom inside corner. The lugs are so shaped as to loosely seat and centrally position a metering cup 23 within the valve housing. Circumferentially spaced lugs 24, 24 at the base of the metering cup serve to hold the bottom wall thereof in spaced relation to the bottom of the valve housing thereby forming flow spaces 25, 25 which connect the interior of the valve housing around the metering cup with the axial bore 26 of the inlet 18. This arrangement permits a limited rotation of the metering cup relative to the valve housing for a purpose to be described in detail later herein. If desired, the metering cup and valve housing may be formed integrally.

A second or movable gasket 27 has a central opening 28 and is diametrically sized to fit loosely in the valve housing.

A cup-shaped valve body 29 is diametrically smaller than the inside of the metering cup to provide a flow space 30 therebetween. The inside of the valve body is preferably tapered as at 31 to form a narrow annular seal rim 32. When the valve body is in its uppermost position, with the valve closed as shown in Figure 1, the rim engages the lower gasket 27 to act as a seal. A positioning boss 33, depending from the base of the valve body, is embraced by one end of a coiled spring 34 the other end of which seats on the bottom of the metering cup. The spring normally maintains the valve body and the two gaskets in seated relation.

The passageways so far defined comprise the flow channel to the interior of the container through the aligned openings 12, 14 and 28 of the container and gaskets, the flow space 35 between the valve housing and metering cup, the spaces 25, 25 and the axial bore 26 of the tubular inlet. This is the flow channel by which the container is filled under pressure with the valve being closed after the filling operation by the coiled spring 34. It will be noted that the passageways are relatively large to effect a quick and easy filling of the container.

A valve stem 36 extends in axial alignment upwardly from the valve body through the gaskets and the container head. The valve stem is embraced by a press-button or spray tip 37. Preferably, the button tightly but removably embraces the stem. The internal bore 38 of the press-button has a slot 39 which extends along the valve stem and terminates in an expansion chamber 40 between the adjacent ends of the button bore and the valve stem. A terminal orifice 41 connects the expansion chamber to the atmosphere.

It will be noted that the lower end of the press-button is of reduced diameter having an intermediate downwardly tapered exterior portion 42 and a cylindrical end portion 43. The tapered portion is of a diameter sufficiently smaller than the opening 12 in the container head to permit free movement of the button relative to the head without contact with the edges of the opening. The cylindrical portion is sized to tightly fit into the aligned openings of the gaskets.

A flow opening 44, through the sidewall of the press-button at its cylindrical end, connects the interior of the cup of the valve body with the slot 39. As shown in Figure 1, when the valve is closed the seal between the annular rim 32 of the valve body and the lower gasket 27 serves to seal the interior of the container from the atmosphere.

The valve body and stem construction, the metering cup, and the valve housing described may be made of any suitable material but it is preferred that they be of a rigid molded plastic such as nylon. The press-button is also of a molded plastic but preferably resilient such as polyethylene.

Operation of the valve mechanism will now be described.

The container 10 is filled with the press-button 37 removed, leaving only the valve stem extending through the openings 12, 14 and 28 of the container head and gaskets. As an aerosol mixture with a propellant is injected through the filling channel around the valve stem, the valve body 29 is depressed by a collapse of the coiled spring 34. The mixture then passes through the passageways or spaces 12, 14, 28, 35, 25 and 26 to fill the container and the valve housing, including the metering cup. When the container is filled, release filling pressure causes the coiled spring to urge the sealing rim 32 into seated engagement with the lower gasket 27 thereby closing the valve.

As all of the filling passageways are relatively large, the container is easily and quickly filled.

The press-button 37 is then applied to the valve stem 36 until it abuts the cup of the valve body 29. Less pressure is required to snap the button in place than is exerted in the opposite direction by the coiled spring 34 and the internal pressure of the contained aerosol mixture.

The valve mechanism is now ready to eject the aerosol mixture with the relative position of parts as shown in Figure 1.

When the press-button is partially depressed a distance to sufficiently break the seating engagement of the gaskets 13 and 27 and move the gasket 27 into seated engagement with the rim of the metering cup 23, contents under pressure in the container flow around the lower gasket and into the space between both gaskets. Friction between the press-button and the gasket 27 serves to hold the gasket on the metering cup. In this relation of parts the metering cup is sealed.

Further depression of the press-button moves the valve body to disengage the rim 32 from the gasket 27. The parts are then positioned as shown in Figure 2. The interior of the metering cup is thereby opened to flow to the atmosphere. As the contents of the cup are under pressure of the propellant, the material flows through the space 30 around the valve body, through the flow opening 44, the slot 39 along the valve stem into the expansion chamber 40, and finally through the terminal orifice 41 to the atmosphere where it is ejected in spray or aerosol form. As the flow from the metering cup progresses the internal pressure therein is reduced. The resulting pressure differential on the gasket 27 thereby effects an increasingly tighter seal with the rim of the cup during the discharge operation. When the metering cup is fully discharged, the press-button is released and the coiled spring returns the valve parts to the positions shown in Figure 1. The interior of the metering cup, under atmospheric pressure, is then opened to flow from the interior of the container under a greater pressure exerted by the propellant. The cup is thereby filled for a subsequent discharge upon an actuation of the press-button. By this arrangement, the interior parts of the closed valve are maintained under pressures of both the propellant and the coiled spring. These pressures are opposed only by atmospheric pressure exerted on the interior of the cup-shaped valve body through the outlet channels in the press-button.

As previously described, the metering cup 23 may be constructed as an integral part of the body 15. However, the construction as shown and described offers certain advantages. The separate construction of parts requires less expensive dies and permits some relative rotation of the cup and body thereby insuring self-adjustment of the cup rim on the lower gasket and a more positive seal between the parts.

Although the invention has been described herein more or less precisely as to details, it is to be understood that the invention is not to be limited thereby, as changes may be made in the arrangement and proportion of parts, and equivalents may be substituted, without departing from the spirit and scope of the invention.

I claim as my invention:

1. A metering valve mechanism comprising a cup-shaped metering member, a gasket member normally spaced from the open end of said metering member, one of said members being movable relative to the other whereby to engage and disengage the rim of the cup of the metering member and the gasket member, an actuating member for said one member and having a dispensing channel for the metering member, and a cup-shaped valve body operatively connected to said actuating member and arranged to be actuated thereby into and out of engagement with said gasket member to close and open the dispensing channel, said actuating member being arranged to alternately open and close the cup-shaped member and the dispensing channel.

2. A metering valve mechanism comprising a cup-shaped metering member, a gasket member normally spaced from the open end of said metering member, an actuating member for moving said gasket member into and out of engagement with said open end of the metering member, a cup-shaped valve body movable toward and away from said gasket member, said actuating member having a dispensing channel for the metering member to be opened and closed with the disengagement and engagement of the valve body and gasket member, and means connecting said actuating member and valve body whereby to alternately open and close the metering member and dispensing channel.

3. A metering valve mechanism comprising a metering cup, an annular flexible gasket normally spaced from the open end of said cup and movable into and out of engagement with the rim of the cup, a cup-shaped valve body within said metering cup and movable into and out of rim engagement with said gasket, an actuator member extending through said gasket and connected to said valve body, said actuator member having a dispensing channel connecting the interior of the valve body cup and the exterior of the valve mechanism, and spring means normally urging said valve body in rim engagement with the gasket.

4. A metering valve mechanism for a container comprising a first sealing gasket having a container filler opening, a housing arranged for sealing engagement with the gasket around said opening, a metering cup in said housing, a second sealing gasket having an opening therethrough and located for movement between the rim of the metering cup and the first gasket, a cup-shaped valve body within said metering cup and movable into and out of rim engagement with said second gasket, spring means normally maintaining the rim of the valve body against the second gasket and the gaskets in engagement, and an actuating member extending through said gasket openings and operatively connected to said valve body to effect relative movement of the metering cup and second gasket and valve body, said actuating member having a dispensing channel connecting the interior of the metering cup and the exterior of the valve mechanism when the second gasket and valve body are disengaged.

5. A metering valve mechanism comprising a first annular resilient sealing gasket, clamping means holding said first gasket in desired position, a metering cup facing said gasket and spaced therefrom, a second annular resilient sealing gasket between the first gasket and the rim of the metering cup, a cup-shaped valve body movable into and out of rim engagement with the second gasket to open and close the opening therein, an actuating member extending through said gaskets and tightly encircled thereby, said actuating member having a dispensing channel connecting the interior of the cup-shaped valve body and the exterior of the valve mechanism, and means operatively connecting the actuating member and the valve body for alternately moving the second gasket relative to the metering cup and the cup-shaped valve body relative to the second gasket.

6. A metering valve mechanism for a container having a closure cap portion with a filling opening, comprising a first annular resilient gasket mounted in said cap around the opening, a metering cup mounted to face said gasket and spaced therefrom, a second annular resilient sealing gasket between the first gasket and the rim of the metering cup, a cup-shaped valve body in the metering cup and movable into and out of rim engagement with the second gasket to open and close the opening therein, an actuating member extending through said gaskets and tightly encircled thereby, said actuating member having a dispensing channel connecting the spaces on opposite sides of the gaskets from the interior of the cup-shaped valve body to the exterior of the valve mechanism, and means operatively connecting the actuating member and the valve body for alternately moving the second gasket relative to the metering cup and the cup-shaped valve body relative to the second gasket.

7. A metering valve mechanism for a container having a closure cap portion with a filling opening, comprising a first annular resilient gasket mounted in said cap around the opening, a housing engaging the gasket and depending from the closure cap, a metering cup in the housing located to face the gasket in spaced relation thereto, a second annular resilient sealing gasket between the first gasket and the rim of the metering cup, a cup-shaped valve body in the metering cup and movable into and out of rim engagement with the second gasket to open and close the opening therein, an actuating member extending through said gaskets and tightly encircled thereby, said actuating member having a dispensing channel connecting the interior of the cup-shaped valve body to the exterior of the valve mechanism, and means operatively connecting the actuating member and the valve body for alternately moving the second gasket relative to the metering cup and the cup-shaped valve body relative to the second gasket.

8. A metering valve mechanism for a container having a closure cap portion with a filling opening, comprising a first annular resilient gasket mounted in said cap around the opening, a tubular cup-shaped housing mounted in the closure cap portion against the gasket and having an inlet in the bottom thereof, a metering cup mounted in and extending from the bottom of the housing toward the gasket with its rim in spaced relation thereto, a second annular resilient sealing gasket between the first gasket and the rim of the metering cup, a cup-shaped valve body in the metering cup and movable into and out of rim engagement with the second gasket to open and close the opening therein, an actuating member extending through said gaskets and tightly encircled thereby, said actuating member having a dispensing channel connecting the interior of the cup-shaped valve body to the exterior of the valve mechanism, and means operatively connecting the actuating member and the valve body for alternately moving the second gasket relative to the metering cup and the cup-shaped valve body relative to the second gasket.

9. A metering valve mechanism for a container having a closure cap portion with a filling opening, comprising a first annular resilient gasket mounted in said cap around the opening, a tubular cup-shaped housing mounted in the closure cap portion against the gasket and having an inlet in the bottom thereof, a metering cup extending from the bottom of the housing toward the gasket with its rim in spaced relation thereto, a second annular resilient sealing gasket between the first gasket and the rim of the metering cup, a cup-shaped valve body in the metering cup and movable into and out of rim engagement with the second gasket to open and close the opening therein, spring means normally urging said valve body and gaskets in engagement to open the interior of the metering cup to flow from the housing through the inlet thereof, an actuating member extending through said gaskets and tightly encircled thereby, said actuating member having a dispensing channel connecting the interior of the cup-shaped valve body to the exterior of the valve mechanism, and means operatively connecting the actuating member and the valve body for alternately moving the second gasket relative to the metering cup and the cup-shaped valve body relative to the second gasket.

10. A metering valve mechanism for a container having a closure cap portion with a filling opening, comprising a first annular resilient gasket mounted in said cap around the opening, a tubular cup-shaped housing mounted in the closure cap portion against the gasket and having an inlet in the bottom thereof, a metering cup extending from the bottom of the housing toward the gasket with its rim in spaced relation thereto, said metering cup and housing being spaced to provide flow passageways from the housing inlet to the interior of the metering cup, a second annular resilient sealing gasket movable between the first gasket and rim of the metering cup to open and close the cup to flow from the housing, a cup-shaped valve body in the metering cup and movable into and out of rim engagement with the second gasket around the opening therein, a coiled spring normally urging said valve body into engagement with the second gasket and the gaskets into engagement with each other to open the interior of the metering cup, a stem extending from the valve body through the gaskets, and a stem actuating member removably attached to said stem, said stem and actuating member having spaced portions defining a dispensing channel connecting the interior of the valve body and the exterior of the valve mechanism, the actuating member being arranged for alternately moving the second gasket relative to the metering cup and the cup-shaped valve body relative to the second gasket.

11. A metering valve mechanism for a container having a closure cap portion with a filling opening, comprising a first annular resilient gasket mounted in said cap around the opening, a tubular cup-shaped housing mounted in the closure cap portion against the gasket and having an inlet at the bottom thereof, a metering cup, spacing means for seating the cup in spaced relation to the bottom and sides of said housing, means limiting relative rotation between the cup and housing, said cup extending toward the gasket with its rim spaced therefrom, a second annular resilient sealing gasket between the first gasket and the rim of the metering cup, a cup-shaped valve body in the metering cup and movable into and out of rim engagement with the second gasket to open and close the opening therein, spring means normally urging said valve body and gaskets in engagement to open the interior of the metering cup to flow from the housing through the inlet thereof, an actuating member extending through said gaskets and tightly encircled thereby, said actuating member having a dispensing channel connecting the spaces on opposite sides of the gaskets from the interior of the cup-shaped valve body to the exterior of the valve mechanism, and means operatively connecting the actuating member and the valve body for alternately moving the second gasket relative to the metering cup and the cup-shaped valve body relative to the second gasket.

12. A metering valve mechanism for a container having a closure cap portion with a filling opening, comprising a first annular resilient gasket mounted in said cap around the opening, a tubular cup-shaped housing mounted in the closure cap portion against the gasket and having an inlet in the bottom wall thereof, a metering cup, spaced positioning bosses at the lower inside corner of the housing to mount the cup in spaced relation to the housing, lugs on the metering cup for engagement with said bosses to limit relative rotation of the cup in the housing, said cup extending toward the gasket with its rim spaced therefrom, a second annular resilient sealing gasket between the first gasket and the rim of the metering cup, a cup-shaped valve body in the metering cup and movable into and out of rim engagement with the second gasket to open and close the opening therein, spring means normally urging said valve body and gaskets in engagement to open the interior of the metering cup to flow from the housing through the inlet thereof, an actuating member extending through said gaskets and tightly encircled thereby, said actuating member having a dispensing channel connecting the spaces on opposite sides of the gaskets from the interior of the cup-shaped valve body to the exterior of the valve mechanism, and means operatively connecting the actuating member and the valve body for alternately moving the second gasket relative to the metering cup and the cup-shaped valve body relative to the second gasket.

13. A metering valve mechanism for a container having a closure cap portion with a filling opening, comprising a first annular resilient gasket mounted in said cap around the opening, a tubular cup-shaped housing mounted in the closure cap portion against the gasket and having an inlet in the bottom wall thereof, a metering cup, spaced positioning bosses at the lower inside corner of the housing to mount the cup in spaced relation to the housing, lugs on the metering cup for engagement with said bosses to limit relative rotation of the cup in the housing, said cup extending toward the gasket with its rim spaced therefrom, a second annular resilient sealing gasket movable between the first gasket and rim of the metering cup to open and close the cup to flow from the housing, a cup-shaped valve body in the metering cup and movable into and out of rim engagement with the second gasket around the opening therein, a coiled spring normally urging said valve body into engagement with the second gasket and the gaskets into engagement with each other to open the interior of the metering cup, a stem extending from the valve body through the gaskets, and a stem actuating member removably attached to said stem, said stem and actuating member having spaced portions defining a dispensing channel connecting the interior of the valve body and the exterior of the valve mechanism, the actuating member being arranged for alternately moving the second gasket relative to the metering cup and the cup-shaped body relative to the second gasket.

References Cited in the file of this patent
UNITED STATES PATENTS

| | | |
|---|---|---|
| 2,562,111 | Michel | July 24, 1951 |
| 2,693,983 | Howell | Nov. 9, 1954 |
| 2,701,163 | Teller et al. | Feb. 1, 1955 |